(12) United States Patent
Boileau (10) Patent No.: US 11,512,641 B2
(45) Date of Patent: Nov. 29, 2022

(54) UPPER AXIAL RETENTION FOR A CASCADE-TYPE THRUST REVERSER WITH SLIDING VANES OF D-SHAPED STRUCTURE

(71) Applicant: Safran Nacelles, Gonfreville l'Orcher (FR)

(72) Inventor: Patrick Boileau, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/238,602

(22) Filed: Apr. 23, 2021

(65) Prior Publication Data

US 2021/0239047 A1 Aug. 5, 2021

Related U.S. Application Data

(63) Continuation of application No. PCT/FR2019/052504, filed on Oct. 22, 2019.

(30) Foreign Application Priority Data

Oct. 23, 2018 (FR) ...................................... 18/59775

(51) Int. Cl.
*F02C 7/20* (2006.01)
*F02K 1/56* (2006.01)

(52) U.S. Cl.
CPC .................. *F02C 7/20* (2013.01); *F02K 1/56* (2013.01); *F05D 2220/323* (2013.01)

(58) Field of Classification Search
CPC ..... F02C 7/20; F02K 1/56; F02K 1/70; F02K 1/02; B64D 29/06; B64D 29/08; F05D 2220/323
See application file for complete search history.

(56) References Cited

U.S. PATENT DOCUMENTS 4,044,973 A * 8/1977 Moorehead ............ B64D 27/26
244/54
4,585,189 A * 4/1986 Buxton .................. B64D 29/00
49/113

(Continued)

FOREIGN PATENT DOCUMENTS

EP 3276151 1/2018
FR 2911372 A1 * 7/2008 ............. B64D 29/06

(Continued)

OTHER PUBLICATIONS

International Search Report for International Application PCT/FR2019/052504, dated Feb. 21, 2020.

*Primary Examiner* — Craig Kim
(74) *Attorney, Agent, or Firm* — Burris Law, PLLC (57) ABSTRACT

A nacelle for use in an aircraft having a turbojet engine (the turbojet engine including a fan casing and a suspension pylon) includes a D-shaped structure downstream section embedding a thrust reverser device. The D-shaped structure downstream section includes a movable cascades vane. The D-shaped structure downstream section also includes two D-shaped half-structures each having an outer half-cowl movable in translation along a longitudinal axis, a connector between the cascades vane and the outer half-cowl, a twelve o'clock half-bifurcation, an inner half-structure defining an inner portion of the annular flow path, and a twelve o'clock half-beam mounted on the twelve o'clock half-bifurcation articulated on the pylon. The nacelle further includes an axial retention device of the downstream section of the nacelle, relative to the turbojet engine, configured to provide a connection defining an axial retention between the twelve o'clock half-beam and a fixed element of the fan casing.

11 Claims, 4 Drawing Sheets

(56) References Cited

U.S. PATENT DOCUMENTS

| | | | | |
|---|---|---|---|---|
| 4,634,081 | A * | 1/1987 | Chee | B64D 27/26 |
| | | | | 60/797 |
| 4,697,763 | A * | 10/1987 | Vermilye | B64D 29/06 |
| | | | | 244/129.4 |
| 4,920,744 | A * | 5/1990 | Garcia | B64D 29/08 |
| | | | | 244/54 |
| 5,350,136 | A * | 9/1994 | Prosser | B64D 29/08 |
| | | | | 244/129.4 |
| 5,474,258 | A * | 12/1995 | Taylor | B64D 27/26 |
| | | | | 60/797 |
| 7,484,356 | B1 * | 2/2009 | Lair | F02K 1/72 |
| | | | | 60/230 |
| 8,627,644 | B2 * | 1/2014 | Vauchel | F02K 1/72 |
| | | | | 60/226.3 |
| 2010/0001123 | A1 * | 1/2010 | Hillereau | B64D 29/06 |
| | | | | 244/54 |
| 2021/0316872 | A1 * | 10/2021 | Lacko | F02C 7/00 |

FOREIGN PATENT DOCUMENTS

| | | |
|---|---|---|
| FR | 3031726 | 7/2016 |
| FR | 3031728 | 7/2016 |
| WO | 2014132011 | 9/2014 |

\* cited by examiner

UPPER AXIAL RETENTION FOR A CASCADE-TYPE THRUST REVERSER WITH SLIDING VANES OF D-SHAPED STRUCTURE

CROSS-REFERENCE TO RELATED APPLICATIONS

This application is a continuation of International Application No. PCT/FR2019/052504, filed on Oct. 22, 2019, which claims priority to and the benefit of FR 18/59775 filed on Oct. 23, 2018. The disclosures of the above applications are incorporated herein by reference.

FIELD

The present disclosure relates to a propulsion unit for an aircraft and to an aircraft including such a propulsion unit.

BACKGROUND

The statements in this section merely provide background information related to the present disclosure and may not constitute prior art.

Figure 1:
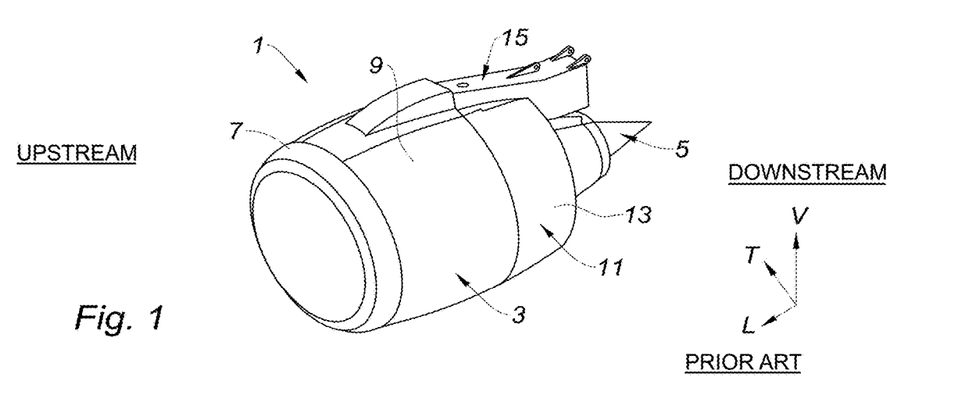
FIG. 1 is a perspective view of a propulsion unit of the prior art.

An aircraft is moved by several propulsion units each including a turbojet engine housed in a nacelle. Reference is made to FIG. 1 illustrating a propulsion unit 1 of the prior art. A propulsion unit 1 includes a nacelle 3 and a turbojet engine 5, for example of the bypass type, capable of generating via the blades of the rotating fan a hot gases flow (also called primary flow) and a cold air flow (also called secondary flow) which circulates outside the turbojet engine through an annular passage, also called flow path, formed between two concentric walls of the nacelle 3. The primary and secondary flows are ejected from the turbojet engine from the rear of the nacelle 3.

The nacelle 3 generally has a tubular structure comprising an upstream section or air inlet 7, located upstream of the turbojet engine 5, a median section 9 intended to surround a fan of the turbojet engine, a downstream section 11, intended to surround the combustion chamber of the turbojet engine 5, embedding thrust reversal means, and can be terminated by an ejection nozzle located downstream of the turbojet engine.

The downstream section 11 generally has an outer structure including an outer cowl 13, which defines with a concentric inner structure (not visible in FIG. 1) called "Inner Fixed Structure" (IFS), the annular flow path serving to channel the cold air flow.

The inner structure defines an inner portion of the annular flow path and generally includes two half-shells connected together "at six o'clock" via a locking device.

Generally, the nacelle 3 is connected via a suspension pylon 15 also called reactor mast to the wing of the aircraft (not represented).

The thrust reversal means allow, during the landing of an aircraft, improve braking capacity by redirecting forward a majority fraction of the thrust generated by the turbojet engine 5.

In this phase, the reverser generally obstructs the flow path of the cold air flow and directs the latter forward of the nacelle 3, generating a counter-thrust in addition to the braking of the aircraft wheels. The means implemented to achieve this reorientation of the cold air flow vary depending on the type of thrust reverser.

A common configuration is that of the so-called "cascades" thrust reversers.

In this type of thrust reverser, the outer cowl 13 of the downstream section is sliding. The downstream translation of this sliding cowl allows uncovering thrust reverser cascades bringing the flow path of the cold flow into communication with the outside of the nacelle.

The translation of the outer cowl 13 further allows deploying blocking flaps in the flow path of the cold flow. Thus, by the combined action of the blocking flaps and thrust reverser cascades, the cold flow is redirected forward of the nacelle.

As mentioned above, the thrust reversal means are housed in the downstream section of a nacelle. There are mainly three types of structural configuration known for the downstream section, namely the structures respectively called "C-shaped" (or "C-duct"), "D-shaped" (or "D-duct") and "O-shaped" (or "O-duct") structures.

In the following description, the expression "D-shaped structure nacelle" defines a "nacelle whose downstream section is with a D-shaped structure". The same applies to a "C-shaped structure nacelle" or an "O-shaped structure nacelle". Likewise, the expression "D-shaped structure" defines the structural configuration of the downstream section of the nacelle. The same applies to a "C-shaped structure" or an "O-shaped structure".

Figure 2:
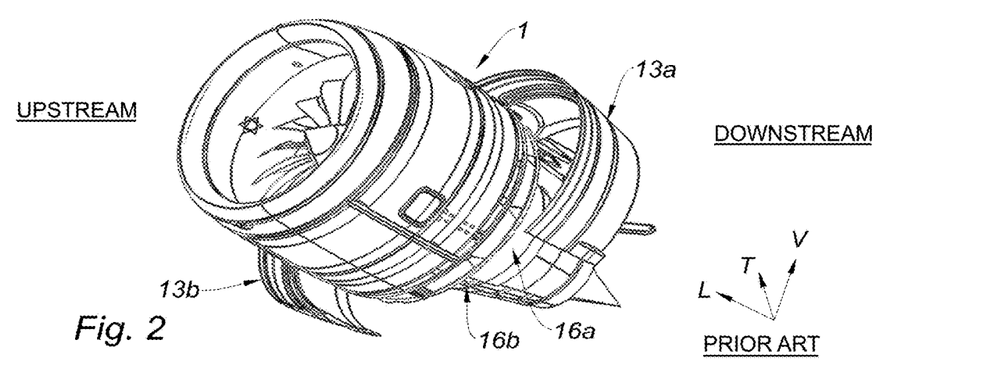
FIG. 2 is a perspective view a propulsion unit of the prior art, during the opening of the nacelle for the maintenance of the turbojet engine.

An O-shaped structure nacelle (not represented in the figures) includes an integral annular outer cowl, while a C-shaped structure has two outer half-cowls 13a, 13b, visible in FIG. 2 illustrating a propulsion unit 1 during opening for maintenance.

In an O-shaped or C-shaped structure, the integral annular outer cowl or the outer half-cowls are mounted in translation along sliding rails disposed on either side of the suspension pylon of the propulsion unit.

The outer cowling, defined by the integral annular outer cowl of an O-shaped structure or by the outer half-cowls of a C-shaped structure, is guided at the level of its rails mounted at twelve o'clock in the nacelle.

To access the turbojet engine of a C-shaped structure nacelle, the two half-cowls 13a, 13b initially locked together at six o'clock are first unlocked when the nacelle is in operation, then these cowls are subsequently opened "in butterfly" about an axis substantially coincident with the longitudinal axis of the pylon, then in a third step, the two half-shells 16a, 16b forming the inner structure of the downstream section are unlocked, then in a fourth step, the two half-shells 16a, 16b are opened "in butterfly" about an axis parallel to the longitudinal axis of the nacelle.

To access the turbojet engine of an O-shaped structure nacelle, first the integral annular outer cowl is slid downstream of the nacelle and then, in a second step, the two half-shells forming the inner structure of the downstream section are unlocked then, in a third step, the two half-shells are opened "in butterfly" about an axis parallel to the longitudinal axis of the nacelle.

It is understood that a disadvantage of C-shaped or O-shaped structures is that the time required to access the turbojet engine to perform maintenance operations is significant. Likewise, the number of steps required to access the turbojet engine is also high.

A known solution of the prior art is to use nacelles with a D-shaped structure downstream section.

Figure 3:
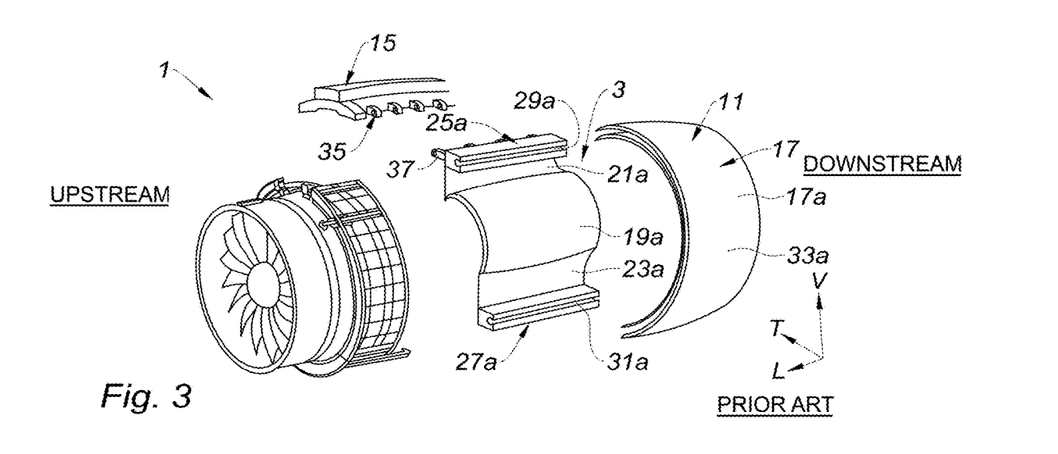
FIG. 3 is an exploded view of a propulsion unit of the prior art equipped with a D-shaped structure nacelle.

FIG. 3 illustrates a propulsion unit 1 in partial exploded view including a nacelle 3 whose downstream section 11 is a D-shaped structure 17.

In a D-shaped structure nacelle, the inner and outer structures of the downstream section of the nacelle are secured to one another, via two connecting islands called bifurcations. The bifurcations are disposed respectively in the positions called "at twelve o'clock" (upper bifurcation) and "at six o'clock" (lower bifurcation).

A D-shaped structure includes two D-shaped half-structures, connected to each other at six o'clock at the bifurcation, and pivotally mounted about an axis substantially coincident with the longitudinal axis of the pylon 15.

A first D-shaped half-structure 17a of the D-shaped structure nacelle is now described, which is identical to a second half-structure forming the D-shaped structure (not shown). The elements composing the D-shaped half-structure 17a can be similar or identical to the elements composing the second D-shaped half-structure, obtained by symmetry of the half-structure 17a with respect to a plane (LV) of the nacelle.

In a D-shaped structure, the D-shaped half-structure 17a includes an inner half-structure 19a, secured at twelve o'clock to a twelve o'clock half-bifurcation 21a and at six o'clock to a six o'clock half-bifurcation 23a.

On the twelve o'clock half-bifurcation 21a is mounted a twelve o'clock half-beam 25a, and on the six o'clock half-bifurcation 23a is mounted a six o'clock half-beam 27a.

Each half-beam 25a, 27a supports a sliding rail 29a, 31a of an outer half-cowl 33a, mounted in translation on each six o'clock and twelve o'clock half-beam. The translating outer cowl, formed by the two outer half-cowls, is called "trans-cowl". Thus, in a D-shaped structure, the translating outer cowl is guided in translation at the level of its rails mounted at six o'clock and twelve o'clock.

Access to the turbojet engine of a D-shaped structure nacelle is obtained first by unlocking the two D-shaped half-structures initially locked together at six o'clock when the nacelle is in operation, then by opening these D-shaped half-structures "in butterfly" about an axis substantially coincident with the longitudinal axis of the pylon. For this purpose, each twelve o'clock half-beam 25a (only one visible in the figure) is articulated on the pylon 15 via a set of hinges 35, these hinges including yokes 37 distributed longitudinally along each half-beam.

By planning to make the inner half-structure 19a secured to the outer half-cowl 33a, the butterfly opening of the D-shaped half-structures allows access to the turbojet engine in only two times. Thus, the intervention time for accessing the turbojet engine is reduced compared to the C-shaped or the O-shaped structures.

In the case of a thrust reverser with cascades, the cascades, which provide the redirection of the cold flow, can be fixed, that is to say, they are carried in their upstream portion by a front frame which is secured to the engine fan casing, surrounding the engine fan.

Figure 4:
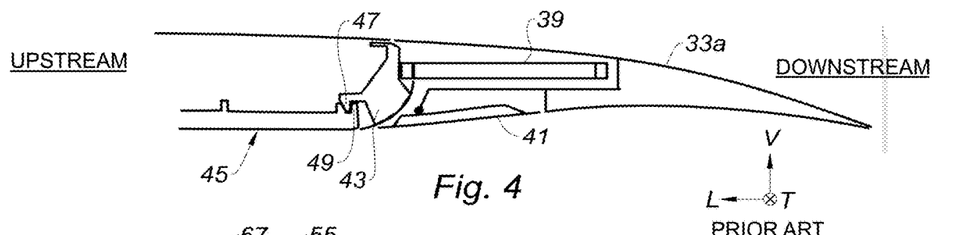
FIG. 4 is a partial longitudinal sectional view of a propulsion unit of the prior art, including a D-shaped structure nacelle whose thrust reverser is of the type with fixed cascades vane.

There is represented in FIG. 4 a partial longitudinal sectional view of a propulsion unit including a D-shaped structure nacelle whose thrust reverser is of the type with fixed cascades vane 39. The translation of the half-cowls 33a (only one shown in the figures) between the retracted position illustrated in FIG. 4 and a deployed position in which it opens a passage in the nacelle makes it possible to uncover the cascades vane of the secondary air flow. The reorientation of the secondary air flow passing through the annular flow path is provided by the deployment of blocking flaps 41, illustrated here in the retracted position for an operation of the nacelle in direct jet.

The cascades vane 39 remain fixed relative to the propulsion unit during the translation of the half-cowls. The immobility of the cascades is provided by a front frame 43 supporting these cascades and fixed to the fan casing 45 of the turbojet engine. The front frame 43 is provided at the level of the upstream portion of the cascades. The fixing between the fan casing and the front frame of the cascades is obtained for example by means of a connection of the knife type 47 ("J-ring") equipping the front frame 43 of cascades/groove 49 ("V-groove") mounted on the circumference of a downstream edge of the fan casing 45.

Figure 5:
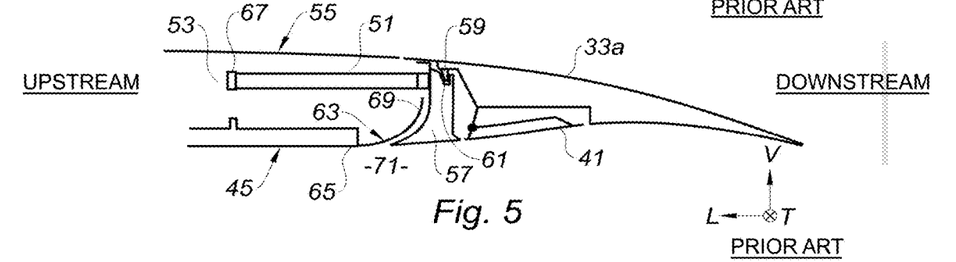
FIG. 5 is a partial longitudinal sectional view of a propulsion unit of the prior art, including a D-shaped structure nacelle whose thrust reverser is of the type with movable cascades vane.

Thrust reversers of the type with cascades movable in translation are known, which are represented in FIG. 5, illustrating in partial longitudinal section a propulsion unit including a D-shaped structure nacelle, whose thrust reverser is of the type with movable cascades vane 51. The fact of providing cascades translating in a thrust reverser makes it possible to reduce the length of the nacelle and consequently to limit its mass and its drag. Indeed, when the nacelle operates in direct jet, the cascades are housed in an annular envelope 53 defined by the annular space comprised between the fan casing 45 of the turbojet engine and the fan cowl 55 of the nacelle, surrounding the fan casing.

The mobility of the cascades vane 51 is provided by a downstream frame 57 supporting these cascades and fixed on the half-cowls 33a (only one shown in the figures). The downstream frame 57 is provided at the level of the downstream portion of the cascades. The fixing between the half-cowls and the downstream frame of the cascades is obtained for example by means of a connection of the knife type 59 ("J-ring") equipping the half-cowls/groove 61 ("V-groove") mounted on a downstream edge of the downstream frame 57 of the cascades.

Thus, when the half-cowls are displaced in translation towards the downstream side of the nacelle for reverse jet operation, this displacement simultaneously causes the displacement of the cascades downstream of the annular envelope 53. Also, the knife/groove type connection also makes it possible to release the half-cowls of the cascades to which they are attached when these cowls are driven in rotation about the longitudinal axis of the nacelle (thanks to the hinges installed on the half-beams twelve o'clock in engagement with the hinges of the suspension pylon) when a maintenance of the nacelle is envisaged.

As can be seen in FIG. 5, unlike a nacelle with a D-shaped structure whose thrust reverser is of the type with fixed cascades discussed in FIG. 4, there is no longer any connection between the fan casing 45 and the thrust reverser device is operated at twelve o'clock.

This absence of connection at twelve o'clock between the engine casing and the thrust reverser device causes a very large axial clearance between the thrust reverser device and the fan casing, which should be limited in order to avoid a distortion of the flow path due to sliding between the half-bifurcations 21a (only one shown in the figures) and the inner half-structures 19a (only one shown in the figures) which can lead to subpar performance in the secondary flow path. This axial clearance should also be limited in order to avoid bracing the twelve o'clock half-beams.

SUMMARY

This section provides a general summary of the disclosure and is not a comprehensive disclosure of its full scope or all of its features.

The present disclosure provides a nacelle for an aircraft turbojet engine, with a downstream D-shaped structure, including a thrust reverser with movable cascades whose axial clearance at twelve o'clock between the fan casing and the thrust reverser device is limited compared to the prior art.

To this end, the present disclosure provides a nacelle for use in an aircraft having a turbojet engine, said turbojet engine including a fan casing and a suspension pylon connecting said nacelle to a wing of the aircraft, said nacelle including an upstream air inlet section, a median section, and a D-shaped structure downstream section. The median section, in the downstream extension of said upstream section, comprising a fan cowl, the annular space comprised between the fan cowl and a fan casing of the turbojet engine defining an annular envelope. The D-shaped structure downstream section embedding a thrust reverser device. The D-shaped structure downstream section comprising cascades vane movable between a retracted position according to which the cascades are housed in said annular envelope of the median section and a deployed position according to which said cascades are displaced downstream of said annular envelope. The D-shaped structure downstream section including two D-shaped half-structures each comprising an outer half-cowl, a connector, a twelve o'clock half-bifurcation, an inner half-structure, and a twelve o'clock half-beam. The outer half-cowl movable in translation during the activation of the actuating means along a substantially longitudinal axis of the propulsion unit between a retracted position providing aerodynamic continuity with the fan cowl and an annular flow path, for an operation of the nacelle in direct jet and a deployed position opening an annular passage in the nacelle for an operation of the nacelle in reverse jet. The connector between the cascades vane and said outer half-cowl, arranged so that the cascades vane are displaced in concert with said outer half-cowl during the activation of said actuating means. The inner half-structure defining an inner portion of the annular flow path of the nacelle when the nacelle is in operation, said inner half-structure being connected to said outer half-cowl by said twelve o'clock half-bifurcation. The twelve o'clock half-beam, mounted on the twelve o'clock half-bifurcation, supporting a sliding rail in translation of the outer half-cowl and articulated on said suspension pylon. The nacelle further includes an actual retention device. for axial retention of the downstream section with a D-shaped structure of the nacelle, relative to the turbojet engine, said axial retention means configured to provide a connection defining an axial retention between the at least one of said twelve o'clock half-beams and a fixed element of the fan casing of the turbojet engine.

Thus, by providing to equip a propulsion unit of the nacelle type with a downstream section in a D-shaped structure and whose cascades of the thrust reverser device are translating with an axial retention means of the downstream section with a D-shaped structure of the nacelle, relative to the turbojet engine, configured to provide a connection defining an axial retention between at least one of said twelve o'clock half-beams and a fixed element of the fan casing of the turbojet engine, an axial connection at twelve o'clock between the turbojet engine and the thrust reverser device is defined. This makes it possible to considerably limit the axial clearance between the thrust reverser device and the fan casing.

According to optional characteristics of the nacelle of the present disclosure according to a first form, the twelve o'clock half-beam is articulated on said suspension pylon by means of a set of hinges, said set of hinges including yokes on said twelve o'clock half-beams, and the axial retention means includes at least one retention rod whose first end is attached to at least one of said yokes on the one hand and whose second end is attached to the fixed element of the fan casing of the turbojet engine on the other hand, said retention rod being configured to define a double-acting abutment between said at least one of said yokes and said fixed element of the fan casing of the turbojet engine.

According to one variation, the at least one retention rod includes a longitudinal axis coaxial with a longitudinal axis of said at least one of said yokes on which said at least one retention rod is attached.

According to another variation, the fixed element of the fan casing of the turbojet engine includes a retention lug having a bore whose longitudinal axis is coaxial with the longitudinal axis of said at least one of said yokes on which said at least one retention rod is attached.

According to yet another variation, the at least one retention rod is mounted in the retention lug of the fixed element of the fan casing of the turbojet engine so as to define a radial clearance between said at least one retention rod and the bore of said retention lug.

According to a second form, the twelve o'clock half-beam is articulated on said suspension pylon via a set of hinges, said set hinges including yokes on said twelve o'clock half-beams, and the axial retention means includes at least one retention tie rod whose first end is mounted on at least one of said twelve o'clock half-beams and whose second end is mounted on the fixed element of the fan casing of the turbojet engine.

According to one variation, the first end of the retention tie rod is mounted at the level of an upstream edge of said at least one of said twelve o'clock half-beams, near the most upstream yoke of said twelve o'clock half-beams.

According to a third form, the twelve o'clock half-beam is articulated on said suspension pylon via a set of hinges, said set of hinges including yokes on said twelve o'clock half-beams, and the axial retention means includes at least one retention rod, at least one retention yoke, and a retention tie rod. The retention rod whose first end is attached to at least one of said yokes on the one hand and whose second end is attached to the fixed element of the fan casing of the turbojet engine on the other hand. The retention rod is configured to define a double-acting abutment between said at least one of said yokes and said fixed element of the fan casing of the turbojet engine. The retention yoke, mounted at the level of the first end of said retention rod. The retention tie rod whose first end is mounted on said retention yoke and a whose second end is mounted on the fixed element of the fan casing of the turbojet engine.

According to an advantageous arrangement common to all of the forms of the nacelle of the present disclosure, the axial retention means is configured to provide a connection defining an axial retention between an upstream edge of said at least one of said twelve o'clock half-beams and the fixed element of the turbojet engine fan casing.

According to another arrangement common to all of the forms of the nacelle of the present disclosure, the fan casing of the turbojet engine includes in its downstream portion a deflection edge, the fixed element of the fan casing of the turbojet engine includes said deflection edge and the axial retention means is configured to provide a connection defining an axial retention between at least one of said twelve o'clock half-beams and said deflection edge of the fan casing of the turbojet engine.

The present disclosure also concerns an aircraft including at least one propulsion unit having a nacelle according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and in the claims, the terms "upstream" and "downstream" must be understood relative to the circulation of the air flow inside the propulsion unit formed by the nacelle and the turbojet engine, that is to say from left to right with reference to FIG. 1.

Likewise, the expressions "inner" and "outer" will be used in a non-limiting manner with reference to the radial distancing relative to the longitudinal axis of the nacelle, the expression "inner" defining a zone radially closer to the longitudinal axis of the nacelle, as opposed to the expression "outer".

Furthermore, in the description and the claims, in order to clarify the description and the claims, the longitudinal, vertical and transverse terminology will be adopted without limitation, with reference to the trihedron L, V, T indicated in the figures.

Furthermore, in all of these figures, identical or similar reference numerals refer to identical or similar members or sets of members.

Figure 6:
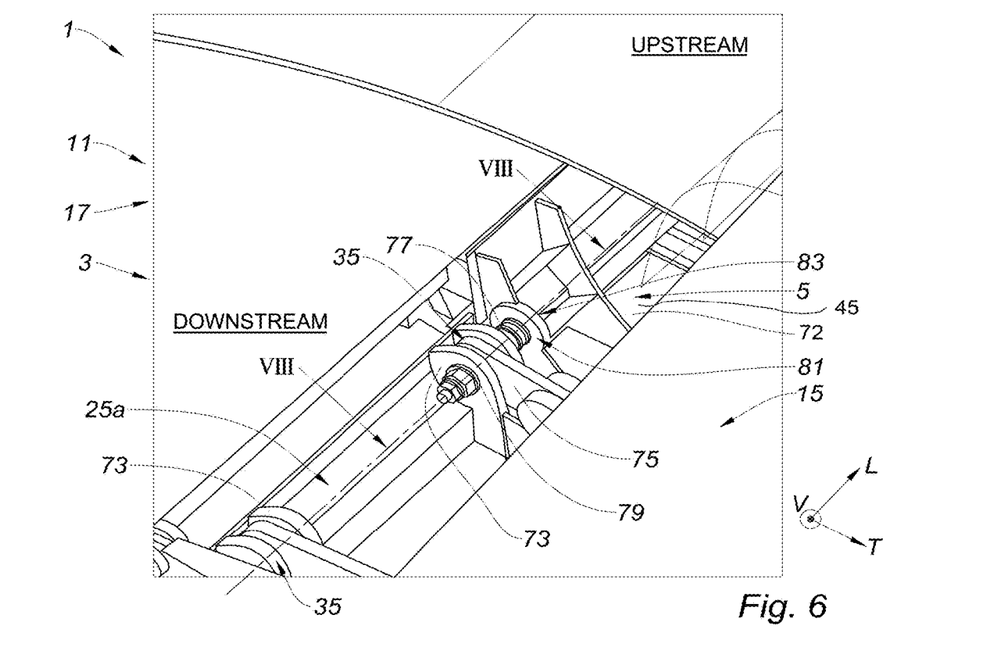
FIG. 6 is a perspective view of a propulsion unit according to the present disclosure in a first form, a thrust reverser device being illustrated in the closed position.

Reference is made to FIG. 6 which illustrates the propulsion unit obtained according to a first form, in isometric view centered on the twelve o'clock zone and in the closed position.

The propulsion unit of the present disclosure incorporates a nacelle of the D-shaped structure downstream section type embedding a thrust reverser device and including cascades vane movable in translation. The propulsion unit of the present disclosure is thus generally in accordance with the description given with reference to FIGS. 1, 3 and 5 and the references used for these figures apply to the propulsion unit of the present disclosure.

According to the present disclosure, the propulsion unit 1 includes, between the D-shaped structure 17 downstream section 11 of the nacelle 3 and the turbojet engine 5, an axial retention device. As will be seen in the remainder of the description, the axial retention device is configured to provide a connection which defines an axial retention between the twelve o'clock half-beams 25a (only one visible in FIG. 6) on the one hand, and a fixed element 72 of the fan casing 45 of the turbojet engine on the other hand. The fixed element 72 of the fan casing 45 may be an integral part of the fan casing, or on the contrary be attached to the fan casing 45.

Each hinge 35 includes in a known manner a yoke 73, mounted on the half-beams 25a (only one shown in the figures). The yoke 73 receives an axis 75 secured to the pylon 15.

According to the first form of the propulsion unit 1 of the present disclosure represented in FIG. 6, the axial retention device includes a retention rod 77 which passes through the yoke 73 and whose first end 79 is attached to the yoke 73, and whose second end 81 is attached to the fixed element 72 of the turbojet engine 5.

The retention rod 77 is arranged in the propulsion unit and configured so that it defines a double-acting abutment between the yoke 73 and the fixed element 72 of the turbojet engine.

For this purpose, the fixed element 72 of the fan casing 45 of the turbojet engine includes a retention lug 83 which has a bore. The longitudinal axis of the bore is substantially coaxial with the longitudinal axis of the yoke 73 to which the retention rod 77 is attached.

Preferably, the retention rod 77 is, on the one hand, attached to a single yoke among the set of yokes distributed longitudinally on the half-beam 25a, for example the most upstream yoke of the twelve o'clock half-beam, and, on the other hand, attached to the fixed element 72 of the turbojet engine.

Figure 7:
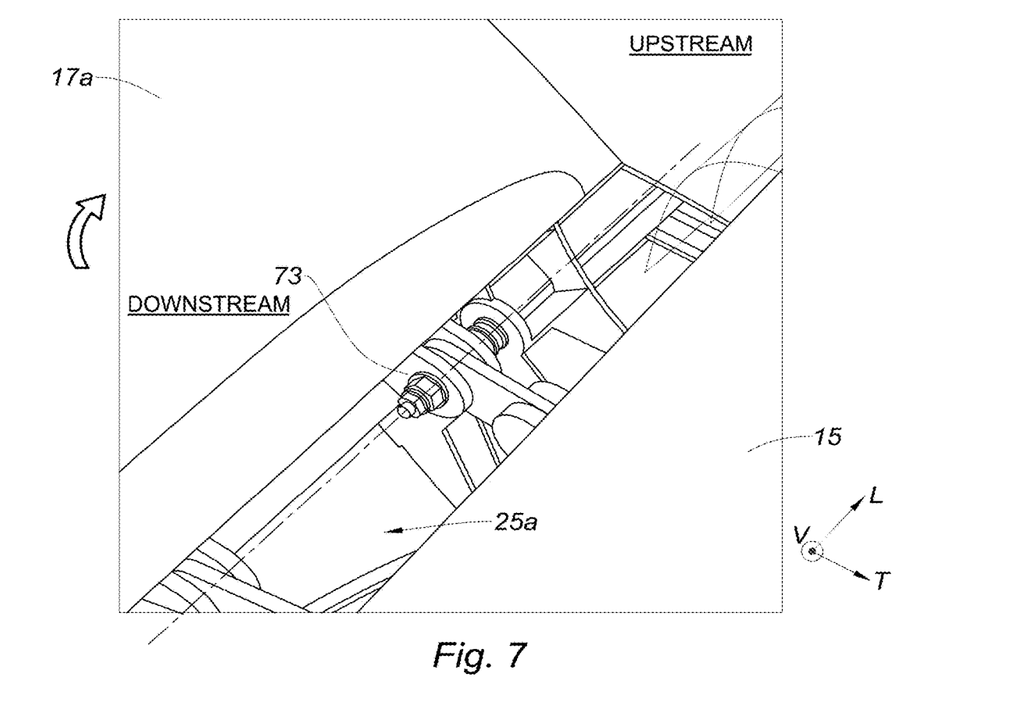
FIG. 7 is a perspective view of the propulsion unit of FIG. 6, the thrust reverser device being illustrated in the open position for maintenance.

The retention rod 77 further has a longitudinal axis coaxial with the longitudinal axis of the yoke 73 to which is attached. This makes it possible not to hinder the opening kinematics of the D-shaped half-structures as can be seen in FIG. 7 illustrating the propulsion unit 1 in which the first D-shaped half-structure 17a has been unlocked from the second D-shaped half-structure (not visible) then was pivoted about the axis substantially coincident with the longitudinal axis of the pylon 15 in order to perform maintenance operations on the turbojet engine.

Figure 8:
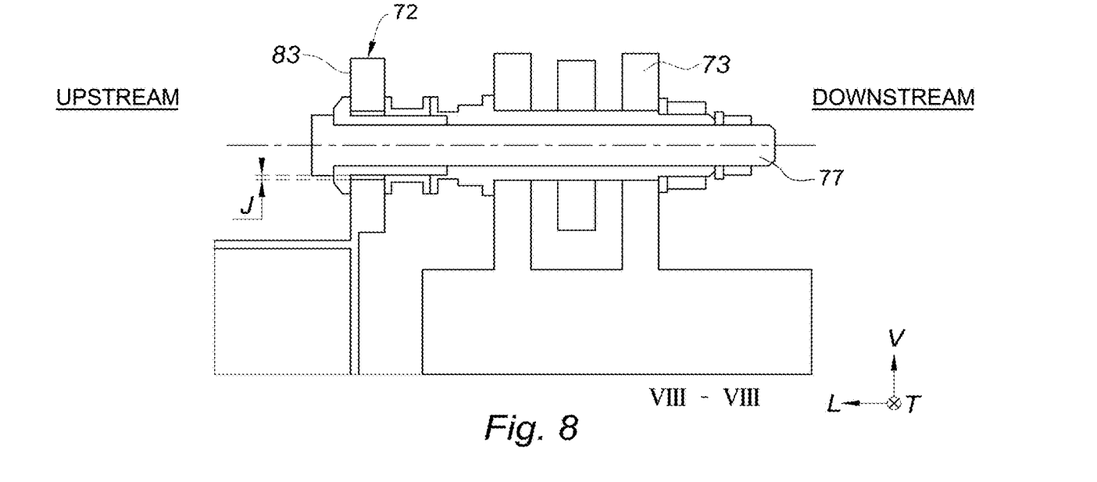
FIG. 8 is a cross-sectional view taken along the line VIII-VIII of FIG. 6.

Reference is made to FIG. 8 schematically illustrating the connection between the retention rod 77, the retention lug 83 of the fixed element 72 and the yoke 73 of the half-beam, in section along the line VIII-VIII of FIG. 6. According to one variation of the present disclosure, the retention rod 77 is mounted in the retention lug 83 of the fixed element 72 so as to define a radial clearance J with the bore of the retention lug 83. This makes it possible to maintain a certain degree of freedom with the motor axis and thus to avoid a situation of redundancy which could constrain the system, the D-shaped half-structures being connected to the pylon by means of the yokes of the hinges while the retention lug is connected to the turbojet engine.

Figure 9:
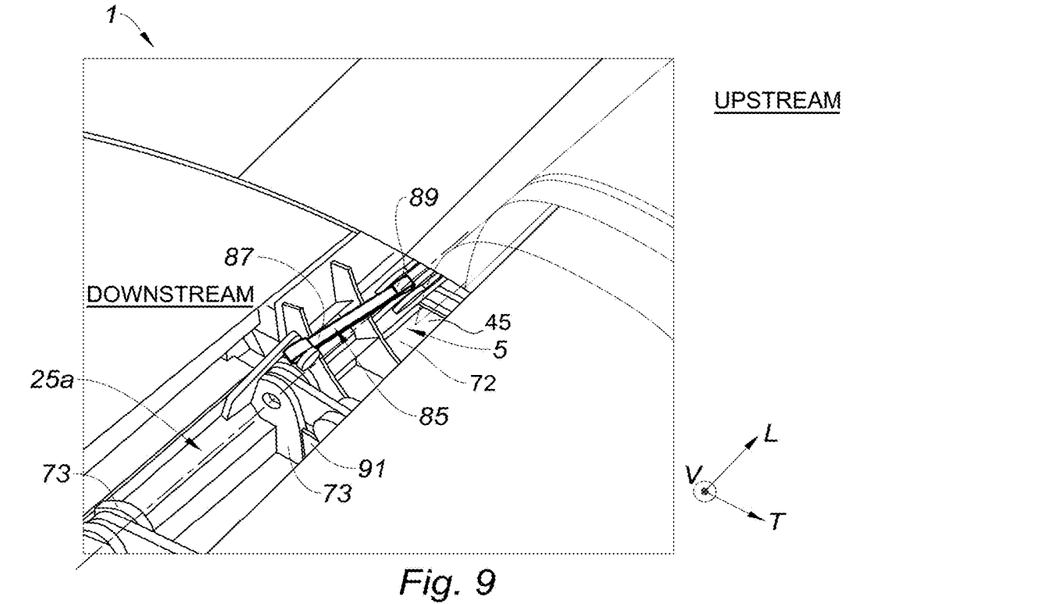
FIG. 9 is a perspective view of a propulsion unit according to the present disclosure in a second form, the thrust reverser device being illustrated in the closed position.
Figure 10:
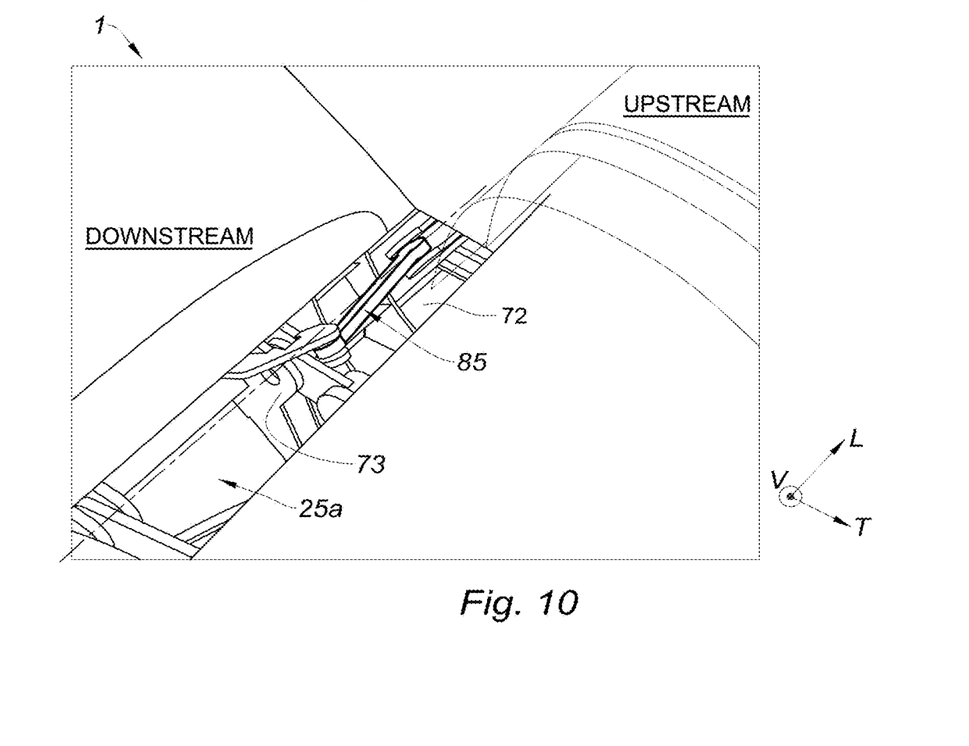
FIG. 10 is a perspective view of the propulsion unit of FIG. 9, the thrust reverser device being illustrated in the open position for maintenance.

Reference is now made to FIGS. 9 and 10 illustrating the propulsion unit obtained according to a second form of the present disclosure, in isometric view centered on the twelve o'clock zone, respectively in the closed position and in a maintenance position according to which the first D-shaped half-structure 17a was unlocked from the second D-shaped half-structure (not visible) then was pivoted around the axis substantially coincident with the longitudinal axis of the pylon 15.

According to the second form of the propulsion unit 1 of the present disclosure, the axial retention device includes a retention tie rod 85.

The retention tie rod 85 includes a first end 87 mounted on the twelve o'clock half-beam 25a and a second end 89 mounted on the fixed element 72 of the turbojet engine 5.

According to a variation of the second form, the first end 87 of the retention tie rod 85 is mounted at an upstream edge 91 of the twelve o'clock half-beam 25a, near the most upstream yoke 73 among the set of yokes 73 mounted on the twelve o'clock half-beam 25a.

The retention tie rod 85 is arranged in the propulsion unit and configured so that it provides a connection defining an axial retention between the twelve o'clock half-beam on which it is mounted and the fixed element 72 of the turbojet engine.

According to a third form, not represented in the figures, the axial retention device combines the axial retention device of the first and second forms.

The axial retention device of the third form includes a retention tie rod in accordance with the retention rod 77 used in the first form, that is to say that a first end is attached to the yoke carried by the half-beam and a second end is attached to the fixed element of the turbojet engine.

At the first end of this retention rod, that is to say the end attached to the yoke carried by the half-beam, is mounted a retention yoke on which is mounted a retention tie rod. The first end of the retention tie rod is mounted on the retention yoke while the second end of the retention tie rod is mounted on the fixed element of the turbojet engine.

This third form makes it possible to further strengthen, compared with the first two forms, the axial retention obtained by the retention means between the half-beam and the turbojet engine.

According to a particular form of the propulsion unit of the present disclosure, the fixed element 72 of the fan casing 45 of the turbojet engine 5 may include, for example, the deflection edge 63, visible in FIG. 5.

The deflection edge is located at the downstream part of the fan casing 45 of the turbojet engine. The deflection edge 63 adopts a generally annular shape, whose its longitudinal section is parabolic. The deflection edge 63 is secured to the fan casing 45 of the turbojet engine 5, and defines an extension of the fan casing 45 at a downstream edge 65 of the fan casing. When the propulsion unit operates in reverse jet, the cascades vane 51 are displaced downstream of the propulsion unit 1 until they are completely extracted from the annular envelope 53. In this thrust reverser configuration (no represented), the front frame 67 of the cascades vane comes to the right of the downstream end 69 of the deflection edge 63. The secondary air flow, deflected by the blocking flaps 41 which are in the deployed position, then comes lick the deflection edge 63. In the reverse jet position, the deflection edge 63 thus defines an aerodynamic continuity between the annular flow path 71 and the cascades vane 51 which are in the retracted position.

According to the present disclosure, the axial retention device is configured to provide a connection defining an axial retention between the twelve o'clock half-beams and the deflection edge of the fan casing of the turbojet engine.

It goes without saying that the present disclosure is not limited to the only forms of this propulsion unit, described above only by way of illustrative examples, but on the contrary it encompasses all the variants involving the technical equivalents of the means described as well as their combinations if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for use in an aircraft having a turbojet engine, said turbojet engine comprising a fan casing and a suspension pylon connecting said nacelle to a wing of the aircraft, said nacelle comprising:
    an upstream air inlet section;
    a median section, in a downstream extension of said upstream air inlet section, comprising a fan cowl, an annular space comprised between the fan cowl and the fan casing of the turbojet engine defining an annular envelope;
    a D-shaped structure downstream section embedding a thrust reverser device, said D-shaped structure downstream section comprising cascades vanes movable relative to the fan casing between a first retracted position wherein the cascades vanes are housed in said annular envelope of the median section and a first deployed position wherein said cascades vanes are displaced downstream of said annular envelope, said D-shaped structure downstream section comprising two D-shaped half-structures each comprising:
        an outer half-cowl movable in translation during activation of an actuator along a substantially longitudinal axis of a propulsion unit between a second retracted position providing aerodynamic continuity with the fan cowl and an annular flow path for an operation of the nacelle in direct jet and a second deployed position opening an annular passage in the nacelle for an operation of the nacelle in reverse jet;
        a connector between the cascades vanes and said outer half-cowl, arranged such that the cascades vanes are displaced simultaneously with said outer half-cowl during the activation of said actuator;

a twelve o'clock half-bifurcation;

an inner half-structure defining an inner portion of the annular flow path of the nacelle when the nacelle is in operation, said inner half-structure being connected to said outer half-cowl by said twelve o'clock half-bifurcation; and a twelve o'clock half-beam mounted on said twelve o'clock half-bifurcation, said twelve o'clock half-beam supporting a translational sliding rail of the outer half-cowl and articulated on said suspension pylon, wherein the nacelle includes an axial retention device for axial retention of the D-shaped structure downstream section of the nacelle, with respect to the turbojet engine, said axial retention device being configured to provide a connection defining an axial retention between at least one of said respective twelve o'clock half-beams of the D-shaped half-structures and a fixed element of the fan casing of the turbojet engine.

2. The nacelle according to claim 1, wherein said twelve o'clock half-beam is articulated on said suspension pylon by a set of hinges, said set of hinges including yokes on said twelve o'clock half-beams, wherein the axial retention device includes at least one retention rod, which first end is attached to at least one of said yokes and which second end is attached to the fixed element of the fan casing of the turbojet engine, said at least one retention rod being configured to define a double-acting abutment between at least one of said yokes and said fixed element of the fan casing of the turbojet engine.

3. The nacelle according to claim 2, wherein said at least one retention rod includes a longitudinal axis coaxial with a longitudinal axis of said at least one of said yokes on which said at least one retention rod is attached.

4. The nacelle according to claim 2, wherein the fixed element of the fan casing of the turbojet engine includes a retention lug having a bore which longitudinal axis is coaxial with a longitudinal axis of said at least one of said yokes on which said at least one retention rod is attached.

5. The nacelle according to claim 4, wherein said at least one retention rod is mounted in the retention lug of the fixed element of the fan casing of the turbojet engine such that a radial clearance between said at least one retention rod and the bore of said retention lug is defined.

6. The nacelle according to claim 1, wherein the axial retention device is configured to provide a connection defining an axial retention between an upstream edge of said at least one of said respective twelve o'clock half-beams and the fixed element of the fan casing of the turbojet engine.

7. The nacelle according to claim 1, wherein the fan casing of the turbojet engine includes in its downstream portion a deflection edge, wherein the fixed element of the fan casing of the turbojet engine includes said deflection edge and wherein the axial retention device is configured to provide a connection defining an axial retention between at least one of said respective twelve o'clock half-beams and said deflection edge of the fan casing of the turbojet engine.

8. An aircraft comprising at least one propulsion unit having a nacelle according to claim 1.

9. A nacelle for use in an aircraft having a turbojet engine, said turbojet engine comprising a fan casing and a suspension pylon connecting said nacelle to a wing of the aircraft, said nacelle comprising:

an upstream air inlet section;

a median section, in a downstream extension of said upstream air inlet section, comprising a fan cowl, an annular space comprised between the fan cowl and the fan casing of the turbojet engine defining an annular envelope;

a D-shaped structure downstream section embedding a thrust reverser device, said D-shaped structure downstream section comprising cascades vanes movable relative to the fan casing between a first retracted position wherein the cascades vanes are housed in said annular envelope of the median section and a first deployed position wherein said cascades vanes are displaced downstream of said annular envelope, said D-shaped structure downstream section comprising two D-shaped half-structures each comprising:

an outer half-cowl movable in translation during activation of an actuator along a substantially longitudinal axis of a propulsion unit between a second retracted position providing aerodynamic continuity with the fan cowl and an annular flow path for an operation of the nacelle in direct jet and a second deployed position opening an annular passage in the nacelle for an operation of the nacelle in reverse jet;

a connector between the cascades vane and said outer half-cowl, arranged such that the cascades vanes are displaced simultaneously with said outer half-cowl during the activation of said actuator;

a twelve o'clock half-bifurcation;

an inner half-structure defining an inner portion of the annular flow path of the nacelle when the nacelle is in operation, said inner half-structure being connected to said outer half-cowl by said twelve o'clock half-bifurcation; and a twelve o'clock half-beam mounted on said twelve o'clock half-bifurcation, said twelve o'clock half-beam supporting a translational sliding rail of the outer half-cowl and articulated on said suspension pylon, wherein the nacelle includes an axial retention device for axial retention of the D-shaped structure downstream section of the nacelle, with respect to the turbojet engine, said axial retention device being configured to provide a connection defining an axial retention between at least one of said respective twelve-o'clock half-beams of the D-shaped half-structures and a fixed element of the fan casing of the turbojet engine, wherein said twelve o'clock half-beam is articulated on said suspension pylon by a set of hinges, said set of hinges including yokes on said twelve o'clock half-beams, wherein the axial retention device includes at least one retention tie rod, which first end is mounted on at least one of said twelve o'clock half-beams and which second end is mounted on the fixed element of the fan casing of the turbojet engine.

10. The nacelle according to claim 9, wherein a first end of said at least one retention tie rod is mounted at an upstream edge of said at least one of said twelve o'clock half-beams, in a vicinity of a most upstream yoke of said yokes of said twelve o'clock half-beams.

11. A nacelle for use in an aircraft having a turbojet engine, said turbojet engine comprising a fan casing and a suspension pylon connecting said nacelle to a wing of the aircraft, said nacelle comprising:

an upstream air inlet section;

a median section, in a downstream extension of said upstream air inlet section, comprising a fan cowl, an annular space comprised between the fan cowl and the fan casing of the turbojet engine defining an annular envelope;

a D-shaped structure downstream section embedding a thrust reverser device, said D-shaped structure downstream section comprising cascades vanes movable relative to the fan casing between a first retracted position wherein the cascades vanes are housed in said annular envelope of the median section and a first deployed position wherein said cascades vanes are displaced downstream of said annular envelope, said D-shaped structure downstream section comprising two D-shaped half-structures each comprising:

an outer half-cowl movable in translation during activation of an actuator along a substantially longitudinal axis of a propulsion unit between a second retracted position providing aerodynamic continuity with the fan cowl and an annular flow path for an operation of the nacelle in direct jet and a second deployed position opening an annular passage in the nacelle for an operation of the nacelle in reverse jet;

a connector between the cascades vanes and said outer half-cowl, arranged such that the cascades vanes are displaced simultaneously with said outer half-cowl during the activation of said actuator;

a twelve o'clock half-bifurcation;

an inner half-structure defining an inner portion of the annular flow path of the nacelle when the nacelle is in operation, said inner half-structure being connected to said outer half-cowl by said twelve o'clock half-bifurcation; and a twelve o'clock half-beam mounted on said twelve o'clock half-bifurcation, said twelve o'clock half-beam supporting a translational sliding rail of the outer half-cowl and articulated on said suspension pylon, wherein the nacelle includes an axial retention device for axial retention of the D-shaped structure downstream section of the nacelle, with respect to the turbojet engine, said axial retention device being configured to provide a connection defining an axial retention between at least one of respective said twelve-o'clock half-beams of the D-shaped half-structures and a fixed element of the fan casing of the turbojet engine, wherein said twelve o'clock half-beam is articulated on said suspension pylon by a set of hinges, said set of hinges including yokes on said twelve o'clock half-beams, wherein the axial retention device includes:

at least one retention rod, which first end is attached to at least one of said yokes and which second end is attached to the fixed element of the fan casing of the turbojet engine, said at least one retention rod being configured to define a double-acting abutment between said at least one of said yokes and said fixed element of the fan casing of the turbojet engine, at least one retention yoke mounted at the first end of said at least one retention rod, and a retention tie rod, which first end is mounted on said at least one retention yoke and which second end is mounted on the fixed element of the fan casing of the turbojet engine.

* * * * *